United States Patent [19]

Pecoraro et al.

[11] Patent Number: 5,401,287
[45] Date of Patent: Mar. 28, 1995

[54] REDUCTION OF NICKEL SULFIDE STONES IN A GLASS MELTING OPERATION

[75] Inventors: George A. Pecoraro, Lower Burrell; Amarendra Mishra, Allison Park; Larry J. Shelestak, Bairdford, all of Pa.; James V. Jones, Toledo, Ohio

[73] Assignee: PPG Industries, Inc., Pittsburgh, Pa.

[21] Appl. No.: 108,267

[22] Filed: Aug. 19, 1993

[51] Int. Cl.⁶ .................... C03B 5/16; C03C 3/078
[52] U.S. Cl. .................... 65/134.1; 65/135.9; 501/72
[58] Field of Search ............. 65/134, 135, 136, 30.1, 65/375, 134.1, 134.3, 135.9; 501/70, 71, 72

[56] References Cited

U.S. PATENT DOCUMENTS

| | | | |
|---|---|---|---|
| 1,936,231 | 11/1933 | Gelstharp et al. | 501/70 |
| 2,197,562 | 4/1940 | Reinker | 501/70 |
| 2,776,900 | 1/1957 | Duncan et al. | 501/70 |
| 2,912,339 | 11/1959 | Middlesworth | 501/71 |
| 2,991,185 | 7/1961 | Smith et al. | 501/71 |
| 3,296,003 | 1/1967 | Swift et.al. | 65/134.1 |
| 3,581,137 | 5/1971 | Arnott et al. | 501/70 |
| 3,912,524 | 10/1975 | Flannery et al. | |
| 3,920,462 | 11/1975 | Flannery et al. | |
| 4,104,076 | 8/1978 | Pons | |
| 4,298,389 | 11/1981 | Johnson et al. | 65/134.3 |
| 4,792,536 | 12/1988 | Pecoraro et al. | 501/70 |
| 4,833,206 | 10/1989 | Jones | 501/71 |
| 4,866,010 | 9/1989 | Boulos et al. | 501/71 |
| 4,919,698 | 4/1990 | Knavish | 65/134 |
| 5,004,706 | 4/1991 | Dickinson | 65/135 |
| 5,006,144 | 4/1991 | Knavish et al. | 65/134 |
| 5,023,210 | 6/1991 | Krumweide et al. | 501/71 |
| 5,091,345 | 2/1992 | Becker | 501/70 |

Primary Examiner—W. Gary Jones
Assistant Examiner—Steven P. Griffin
Attorney, Agent, or Firm—Andrew C. Siminerio

[57] ABSTRACT

Material selected from the group consisting essentially of molybdenum, arsenic, antimony, bismuth, copper, silver, potassium dichromate and iron chromite, is added during the manufacture of soda-lime-silica float glass to reduce the occurrences of nickel sulfide stone defects. Material is added in sufficient amounts such that the resulting glass is at least 0.010 wt. % selected material. In a preferred embodiment of the invention, molybdenum is added in the form of sodium molybdate such that the resulting glass is at least 0.015 wt. % molybdenum.

16 Claims, No Drawings

REDUCTION OF NICKEL SULFIDE STONES IN A GLASS MELTING OPERATION

BACKGROUND OF THE INVENTION

Small particles of nickel sulfide (NiS) usually known as nickel sulfide "stones" sometimes occur in glass and result in severe degradation of the glass quality. Nickel sulfide stones are usually too small to be seen by the unaided eye and are very difficult to be detected by optical inspection means. Nickel sulfide stones as small as 40 microns may cause spontaneous breakage in tempered glass parts. This breakage is related, in part, to the slow phase change in the nickel sulfide stones which create localized stresses. Increased temperature may accelerate the phase change. In addition, there is a large difference between the coefficient of thermal expansion of nickel sulfide stones and that of glass. As a result, change in temperature of a glass product, such as a glass sheet installed in a building or a vehicle, that includes a nickel sulfide stone may further cause intense localized stresses in the vicinity of the stone which may be of sufficient magnitude to spontaneously fracture the sheet. Because it is difficult to detect the presence of nickel sulfide stones in glass, and because their effects may not be exhibited until long after the glass sheets have been installed, prevention of nickel sulfide stones is an important objective for glass makers.

The most straight forward approach to avoiding nickel sulfide stones is to prevent any source of nickel from entering the glass melting furnace; however trace amounts of nickel may appear as naturally occurring impurities in the raw materials used for making glass. Also, the common presence of nickel in stainless steel alloys used in equipment associated with the raw materials mining and handling and other machinery associated with a glass melting operation may lead to the inadvertent introduction of small amounts of nickel into the glass melting furnace, even when strenuous efforts are made to avoid its deliberate introduction. In addition, in some glass compositions, quantities of nickel are added to the batch as a colorant. Nickel may also be found in glass cullet used to make the glass.

It would be desirable if formation of nickel sulfide stones could be prevented in the output from a glass melting furnace in which nickel is present.

U.S. Pat. No. 4,919,698 reduces the occurrence of nickel sulfide stones in glass by electrically imposing oxidizing conditions near the bottom of a melting furnace and at least at a portion of the region between the inlet end and spring zone of the furnace to prevent the presence of reducing conditions that would create or sustain nickel sulfide stones. It should be appreciated that the primary source of nickel sulfide stones may not be from the bottom of the melter. Therefore, another method of stone reduction, i.e. one that addresses the reduction and/or prevention of nickel sulfide stones, regardless of the location of their formation within the melter, is required.

SUMMARY OF THE INVENTION

The present invention discloses a method of reducing the occurrences of nickel sulfide stone defects in soda-lime-silica float glass by adding to the raw batch material, additional material selected from the group consisting essentially of molybdenum, arsenic, antimony, bismuth, copper, silver, potassium dichromate and iron chromite, in an amount such that the resulting glass is at least 0–0.010 wt. % of the selected material. In a preferred embodiment of the invention, molybdenum is added in the form of sodium molybdate such that the resulting glass is at least 0.015 wt. % molybdenum.

The present invention also discloses the addition to the glass batch of at least 0.010 wt. % material selected from the group consisting essentially of molybdenum, arsenic, antimony, bismuth, copper, silver, potassium dichromate, and iron chromite, to reduce the occurrences of nickel sulfide stone defects during the manufacture of soda-lime-silica glass. In a preferred embodiment of the invention, the batch includes at least 0.017 wt. % molybdenum, added in the form of sodium molybdate.

DETAILED DESCRIPTION OF THE INVENTION

Typical soda-lime-silica float glass may be characterized by the following composition on a weight percentage basis of the total glass:

| | |
|---|---|
| $SiO_2$ | 66–75% |
| $Na_2O$ | 10–20 |
| CaO | 5–15 |
| MgO | 0–5 |
| $Al_2O_3$ | 0–5 |
| $K_2O$ | 0–5 |

Nickel, in the form of NiO, is present, if at all, in very small amounts, usually less than 0.002 wt. %. The batch materials combined to produce this glass typically include sand, soda ash, limestone and saltcake. Other materials, including melting and refining aids, tramp materials and impurities, such as SrO, $ZrO_2$, Cl, $Cr_2O_3$, $MnO_2$, BaO, $SnO_2$ and ZnO, may also appear in the glass composition. To this base glass are added constituents that alter the transmittance properties of the glass. A common additive in this category of glasses is iron which gives the glass a green tint as well as reduces total solar energy transmittance and ultraviolet transmittance.

In a typical glass melting furnace to which the present invention relates, batch materials are fed onto the pool of molten glass through an inlet opening at one end of the furnace and form a layer or batch blanket that melts as it progresses into the furnace. Molten glass passes from the furnace through an outlet opening at an exit end of the furnace and into a forming section where the molten glass is deposited onto a pool of molten tin and formed to a desired thickness. Although not limiting in the present invention, a plurality of flames which extend transversely above the molten glass pool from ports in the sidewalls of the furnace operate as the primary heat source for melting the glass batch as disclosed in U.S. Pat. No. 4,919,698. It should be understood that other configurations of glass melting furnaces may also benefit from the present invention.

In the present invention, stone reducing material, and in particular molybdenum, is added to the glass batch to reduce the occurrence of nickel sulfide stones. Initial testing utilized crucible melts that were doped with −100 mesh metallic nickel powder to increase the NiS stone occurrences in the melt and better observe the effects of molybdenum in reducing stone occurrences. Table 1 lists batch materials for a typical clear and green glass composition used for the crucible melts. The 0.5 gm of nickel powder addition resulted in a final NiO concentration in the glass composition of about 0.082 wt. %. It should be appreciated that minor variations in the batch composition or constituents will not significantly affect the trial results.

TABLE 1

|  | Wt. (gm) |
| --- | --- |
| Sand | 500 |
| Soda ash | 173 |
| Dolomite | 121 |
| Limestone | 45 |
| Saltcake | 7.5 |
| Rouge (green glass only) | 3.6 |
| Nickel powder | 0.5 |

The melts were prepared as follows: Approximately half of a Lavasil crucible was filled with batch and then heated in a gas fired Bickely furnace to 2550° F. (1371° C.). Within the first hour, the second half of the crucible was filled and the temperature increased to 2700° F. (1482° C.) and held for four hours. The temperature was then reduced to 2550° F. (1399° C.) and held for one hour. The melt was then poured and placed in an annealing oven where it was annealed overnight from 1200° F. (649° C.).

Test results showed that the addition of molybdenum, added in the form of sodium molybdate, $Na_2MoO_4.2H_2O$, such that the glass composition was 0.1 wt. % Mo for the clear glass and 0.09 wt. % Mo for the green glass composition reduced the stone count from 100 to 3 or less per pound of melt. It should be appreciated that the significance of these test results is not necessarily the actual number of nickel sulfide stones but rather the effectiveness of the molybdenum in reducing the number of stones. These test results from these crucible melts further showed approximately a 15% loss in the amount of molybdenum added to the crucible versus the amount of molybdenum in the glass composition.

Additional trials were conducted to determine the effectiveness of molybdenum in different forms in reducing or eliminating nickel sulfide stones in a clear glass composition. It was noted during the trials that the particle size of the nickel in these tests was smaller than that in the earlier tests. As a result, there were more nickel sulfide stones formed in the melt. Referring to Table 2, stone counts for the clear batch composition were reduced by at least an order of magnitude when molybdenum was added to the crucible melt in the forms of $Na_2MoO_4.2H_2O$, $MoO_2$, $MoO_3$, and metallic molybdenum so that the final glass composition was 0.09 wt. % Mo.

TABLE 2

| Additive | No. of NiS Stones per Melt |
| --- | --- |
| $Na_2MoO_4.2H_2O$ | 28 |
| $MoO_2$ | 69 |
| $MoO_3$ | 90 |
| Mo metal | 68 |
| Standard melt (no Mo) | 705+ |

The findings from the crucible melt were further verified by additional testing using a small scale glass melter that simulated the glass making dynamics of a large scale Siemens type glass furnace. The melter produced glass at a rate of 60–70 lbs. (27–32 kg) per hour. Again, a −100 mesh nickel powder was added to a green glass batch to produce a glass that was about 0.09 wt. % NiO. The addition of sodium molybdate at concentrations resulting in greater than 0.075 wt. % Mo in the glass composition provided over an order of magnitude reduction in the NiS stone count from approximately 5 stones per gram to 0.3 stones per gram. These tests results verified those results found in the crucible melt trials as to the effectiveness of the molybdenum in reducing NiS stones.

Additional trials were conducted on a 450 ton per day Siemens float furnace. Molybdenum, in the form of sodium molybdate, was added to a clear glass batch composition similar to that shown in Table 3.

TABLE 3

|  | Wt. (kg) |
| --- | --- |
| Sand | 1000 |
| Soda ash | 326 |
| Dolomite | 229 |
| Limestone | 97 |
| Saltcake | 6.8 |
| Rouge | 0.31 |
| Nepheline Syenite | 76 |
| Clear glass cullet | 835 |

The NiO concentration in this glass was less than 0.001 wt. %. Molybdenum content was gradually increased to provide a level of 290 parts per million (PPM), i.e. 0.029% by weight of the glass composition. As compared to stone densities in the clear glass prior to the addition of the molybdenum, the stone density at this level was reduced by approximately 85%.

The addition of molybdenum at certain levels altered the color of the float glass during the trial. More particularly, it was observed that as molybdenum concentration increased, the dominant wavelength of the glass, which is determined from the visible light transmittance measurement and is used to determine the glass color, shifted from approximately 495 nm for clear glass with no molybdenum to approximately 530 nm at 0.0150 wt. % molybdenum to approximately 545 nm at 0.0290 wt. % molybdenum. The color shift at 150 PPM molybdenum was barely noticeable in the clear glass. The shift at 290 PPM resulted in a slight brownish green coloration in the glass. It is believed that in colored glasses, e.g. green, bronze or gray, molybdenum concentrations of up to 0.075 wt. % (i.e. five times the 0.015 wt. % level) may be used to further reduce NiS stone occurrences since any coloring effects due to the molybdenum may add to the final desired glass color or would be masked by the color of the glass.

The weight percent of molybdenum added to the glass batch to obtain the 0.015 and 0.029 wt. % Mo in the glass composition was 0.027 and 0.053 wt. %, respectively. However, it is believed that these amounts of molybdenum added to the batch are actually greater than the amount needed to achieve the preferred molybdenum levels in glass if the glass is made under steady state conditions because during the trial, there was a dilution of the molybdenum by the glass already in the melting furnace. Assuming a 15 % loss between the amount of molybdenum added to the batch as compared to the molybdenum content in the glass, as discussion earlier in connection with the crucible melts, to obtain 0.015 and 0.029 wt. % molybdenum in the glass requires 0.0176 and 0.034 wt. % molybdenum in the glass batch, respectively. In addition, the 0.075 wt. % molybdenum level corresponds to a batch content of about 0.088 wt. %.

Table 4 shows additional materials that were tested in high nickel content crucible melts of the type described earlier in Table 1 and proved to be effective in reducing and/or eliminating NiS stone occurrences.

TABLE 4

|  | Wt. % of glass composition in crucible melt |
|---|---|
| Ag | 0.186 |
| As* | 0.098 |
| Bi | 0.144 |
| Cu | 0.178 |
| Sb | 0.137 |
| FeCr$_2$O$_4$** | 0.078 |
| K$_2$Cr$_2$O$_7$ | 0.277 |

*crucible melt included 0.059 wt. % graphite
**crucible melt included 0.42 wt. % rouge Although not limiting in the present invention, referring to Table 4, the materials were added to the crucible melts and reported in the glass compositions in oxide forms. More specifically, silver was added to the glass melt as AgNO$_3$ and reported as Ag$_2$O; arsenic was added as As$_2$O$_5$ and reported as As$_2$O$_3$; bismuth was added and reported as Bi$_2$O$_3$; copper was added as CuO or Cu$_2$O and reported as Cu$_2$O; antimony was added as Sb$_2$O$_5$ and reported as Sb$_2$O$_3$; iron+chromium was added and reported as FeCr$_2$O$_4$; and potassium+chromium was added and reported an K$_2$Cr$_2$O$_7$. Other forms of these materials may be used to provide these NiS stone reducing agents.

It is noted that the weight percent of molybdenum in the glass composition produced in tile Siemens float furnace is only about 15% of the amount required in the glass produced in the crucible melt for clear glass. It is believed that a similar reduction in the weight percent of the materials shown in Table 4 would give comparable NiS stone reduction results in a float glass operation. In addition, assuming the same amount of losses of these materials during the melting and forming of the float glass as was found for the molybdenum crucible melts (about 15%), the weight percentage of these materials in the batch required to significantly reduce the occurrences of NiS stones on the glass may be determined. Table 5 lists these estimated weight percentages for the batch and glass composition for a typical soda-lime-silica glass based on the amounts shown in Table 4.

TABLE 5

|  | Est. wt. % in batch | Est. wt. % in float glass |
|---|---|---|
| Ag | 0.033 | 0.028 |
| As | 0.017 | 0.015 |
| Bi | 0.025 | 0.022 |
| Cu | 0.031 | 0.027 |
| Sb | 0.024 | 0.021 |
| FeCr$_2$O$_4$ | 0.014 | 0.012 |
| K$_2$Cr$_2$O$_7$ | 0.049 | 0.042 |

It is believed that up to five times the amount of material shown in Table 5 may be added to the glass to further reduce NiS stones, depending on the amount of permissible coloration in the glass. More specifically, copper, FeCr$_2$O$_4$ and K$_2$Cr$_2$O$_7$ may color the glass; however as discussed earlier, if these materials are used in the production of colored glass, any coloration due to these additives may add to or be masked by the actual glass color. It should be noted that if the additive produces a desired color, then the amount added might not be limited, i.e. adding more than the required amount of material would not have a negative effect on the NiS stone reduction.

It should be appreciated that the nickel sulfide stone reducing materials disclosed in the present invention may be used in combinations to reduce stone occurrences as well as control possible coloration of the glass due to the materials.

The invention has been described with reference to specific embodiments, but it should be understood that variations and modifications that are known to those of skill in the art may be resorted to within the scope of the invention as defined by the claims that follow.

We claim:

1. In a method of manufacturing soda-lime-silica float glass, including the steps of melting and refining raw batch materials to form molten glass, wherein nickel in said molten glass added as a component of said batch materials or as an impurity in said batch materials, forms nickel sulfide stone defects which degrade the quality of said glass, the improvement comprising the step of:
   reducing the formation of nickel sulfide stones by adding to said batch materials, molybdenum in an amount such that said batch materials are 0.01–0.09 wt. % molybdenum.

2. The method as in claim 1 wherein said molybdenum comprises at least 0.017 wt. % of said batch materials.

3. The method as in claim 2 wherein said molybdenum is added in the form of sodium molybdate.

4. The method as in claim 1 wherein said molybdenum is added to said batch materials in an oxide form.

5. The method as in claim 1 wherein said batch materials includes sand, soda ash, limestone and saltcake.

6. In a method of manufacturing soda-lime-silica float glass, including the steps of melting and refining raw batch materials to form molten glass, wherein nickel in said molten glass added as a component of said batch materials or as an impurity in said batch materials, forms nickel sulfides stone defects which degrade the quality of said glass, the improvement comprising the step of:
   reducing the formation of nickel sulfide stones by adding to said batch materials, molybdenum in an amount such that said soda-lime-silica glass is 0.01–0.075 wt. % molybdenum.

7. The method as in claim 6 wherein said molybdenum is added in an amount such that said soda-lime-silica glass is at least 0.015 wt. % molybdenum.

8. The method as in claim 7 wherein said molybdenum is added in the form of sodium molybdate.

9. The method as in claim 6 wherein said molybdenum is added to said batch material in an oxide form.

10. The method as in claim 6 wherein said soda-lime-silica glass is 66–75 wt. % SiO$_2$, 10–20 wt. % Na$_2$O, 5–15 wt. % CaO, 0–5 wt. % MgO, 0–5 wt. % Al$_2$O$_3$ and 0–5 wt. % K$_2$O.

11. In a method of manufacturing soda-lime-silica float glass, including the steps of melting and refining raw batch materials to form molten glass, wherein nickel in said molten glass added as a component of said batch materials or as an impurity in said batch materials, forms nickel sulfides stone defects which degrade the quality of said glass, the improvement comprising the step of:
   reducing the formation of said nickel sulfide stones by adding to said batch materials, stone reducing material selected from the group consisting essentially of molybdenum, bismuth, copper, silver, potassium dichromate and iron chromite and combinations thereof, in an amount such that said batch materials are 0.01–0.25 wt. % stone reducing material.

12. The method as in claim 11 wherein said stone reducing material is added to said batch materials in an oxide form.

13. The method as in claim 11 wherein said batch materials includes sand, soda ash, limestone and salt cake.

14. In a method of manufacturing soda-lime-silica float glass, including the steps of melting and refining raw batch materials to form molten glass, wherein nickel in said molten glass added as a component of said batch materials or as an impurity in said batch materials, forms nickel sulfide stone defects which degrade the quality of said glass, the improvement comprising the step of:

reducing the formation of nickel sulfide stones by adding to said batch materials, stone reducing material selected from the group consisting essentially of molybdenum, antimony, bismuth, copper, silver, potassium dichromate and iron chromite and combinations thereof, in an amount such that said soda-lime-silica glass is 0.01–0.22 wt. % stone reducing material.

15. The method as in claim 14 wherein said stone reducing material is added to said batch materials in an oxide form.

16. The method as in claim 14 wherein said soda-lime-silica glass is 66–75 wt. % $SiO_2$, 10–20 wt. % $Na_2O$, 5–15 wt. % CaO, 0–5 wt. % MgO, 0–5 $Al_2O_3$ and 0–5 wt. % $K_2O$.

* * * * *